United States Patent [19]

De Filippis et al.

[11] 4,241,370

[45] Dec. 23, 1980

[54] THERMAL RELAYS PARTICULARLY FOR STARTING SINGLE-PHASE ASYNCHRONOUS MOTORS

[75] Inventors: Pietro De Filippis; Amedeo Salvatore; Luigi Trama, all of Naples; Giuseppe Notaro, Pomigliano D'Arco, all of Italy

[73] Assignee: Texas Instruments Incorporated, Attleboro, Mass.

[21] Appl. No.: 960,671

[22] Filed: Nov. 14, 1978

[51] Int. Cl.$^3$ .............................................. H02H 7/08

[52] U.S. Cl. ...................................... 361/24; 318/783; 337/113; 337/327; 337/380; 338/316; 361/29

[58] Field of Search ........................ 361/27, 24, 25, 23, 361/28, 29, 31, 106, 165; 318/783, 784, 785, 788, 792; 338/20, 21, 57, 51, 52, 53, 220, 232, 260, 316, 320, 22 SD; 337/88, 102, 107, 112, 113, 95, 327, 354, 377, 380, 336

[56] References Cited

U.S. PATENT DOCUMENTS

| | | | |
|---|---|---|---|
| 3,568,013 | 3/1971 | Blaha | 357/74 |
| 3,750,082 | 7/1973 | Peterson et al. | 338/220 |
| 3,842,188 | 10/1974 | Peterson et al. | 338/220 X |
| 3,914,727 | 10/1975 | Fabricius | 338/220 X |
| 3,921,117 | 11/1975 | Blaha | 338/220 X |
| 3,925,748 | 12/1975 | Slocum | 338/220 X |
| 3,955,170 | 5/1976 | Geishecker | 338/22 SD |
| 3,958,208 | 5/1976 | Blaha | 338/316 X |
| 4,084,202 | 4/1978 | Stoll | 361/27 X |

FOREIGN PATENT DOCUMENTS

| | | |
|---|---|---|
| 555563 | 8/1943 | United Kingdom . |
| 628567 | 8/1949 | United Kingdom . |

*Primary Examiner*—Patrick R. Salce

*Attorney, Agent, or Firm*—James P. McAndrews; John A. Haug; Melvin Sharp

[57] ABSTRACT

A motor starting relay particularly adapted for use in starting single phase asynchronous motors comprises a resistor element of positive temperature coefficient of resistivity which is compactly arranged within a housing and engaged by electrical contact and terminals means of particular structure and of a material of relatively high thermal resistance in a novel way such that power dissipation or loss by the resistor is reduced to a very low level after it has performed its motor starting function but so that, at the same time, the resistor is adapted to cool more rapidly after interruption of motor operation to permit prompt motor restarting.

11 Claims, 17 Drawing Figures

THERMAL RELAYS PARTICULARLY FOR STARTING SINGLE-PHASE ASYNCHRONOUS MOTORS

BACKGROUND OF THE INVENTION

The present invention relates to improved thermal relays, particularly for use in starting single phase, asynchronous electrical motors in refrigerator compressors and the like. In particular, the invention relates to solid state thermal relays embodying a wafer of a material with a positive temperature coefficient of electrical resistivity (PTC) of the type well-known to those skilled in the art. The invention includes a process for assemblying the relays.

In motor starting, a resistor element of positive temperature coefficient of resistivity is conventionally arranged in series with the start winding of a refrigerator compressor motor or the like to permit a high initial current in the start winding for starting the motor. The resistor element heats up and stabilizes in a high resistance condition during running of the motor so that the start winding current is reduced to a very low level when the start winding has completed its motor starting function. When motor operation is thereafter interrupted by actuation of a motor protector or otherwise, the resistor element cools to reset for subsequent restarting of the motor. In that arrangement, the operating efficiency of the motor is affected—to some extend at least—by power dissipation in the resistor element during normal running operation of the motor. Further, if motor restarting is attempted before the resistor element has sufficiently cooled, the condition of the resistor element may interfere with proper restarting. It would be desirable to reduce such power dissipation in the resistor element to a very low level and, at the same time, to adapt the resistor to be rapidly cooled after interruption of motor operation to permit prompt restarting of the motor if such restarting should be desired a short time after the interruption in motor operation has occured.

It is an object of this invention to provide a novel and improved thermal relay for starting electrical motors; to provide such a relay which is particularly adapted for starting asynchronous motors for refrigerator compressors; to provide such an improved relay incorporating a resistor element of positive temperature coefficient of resistivity wherein the power dissipation as loss in the resistor element during running operation of the motor is reduced to a very low level and wherein the resistor element is also adapted to cool rapidly after interruption of motor operation for promptly resetting the relay for restarting of the motor; to provide such an improved thermal relay which is adapted for economical assembly; and to provide a novel and improved method for assembling such a relay.

BRIEF DESCRIPTION OF THE DRAWING

The present invention will now be described with reference to preferred embodiments of the invention, the description referring to the attached drawings wherein.

Figure 12:
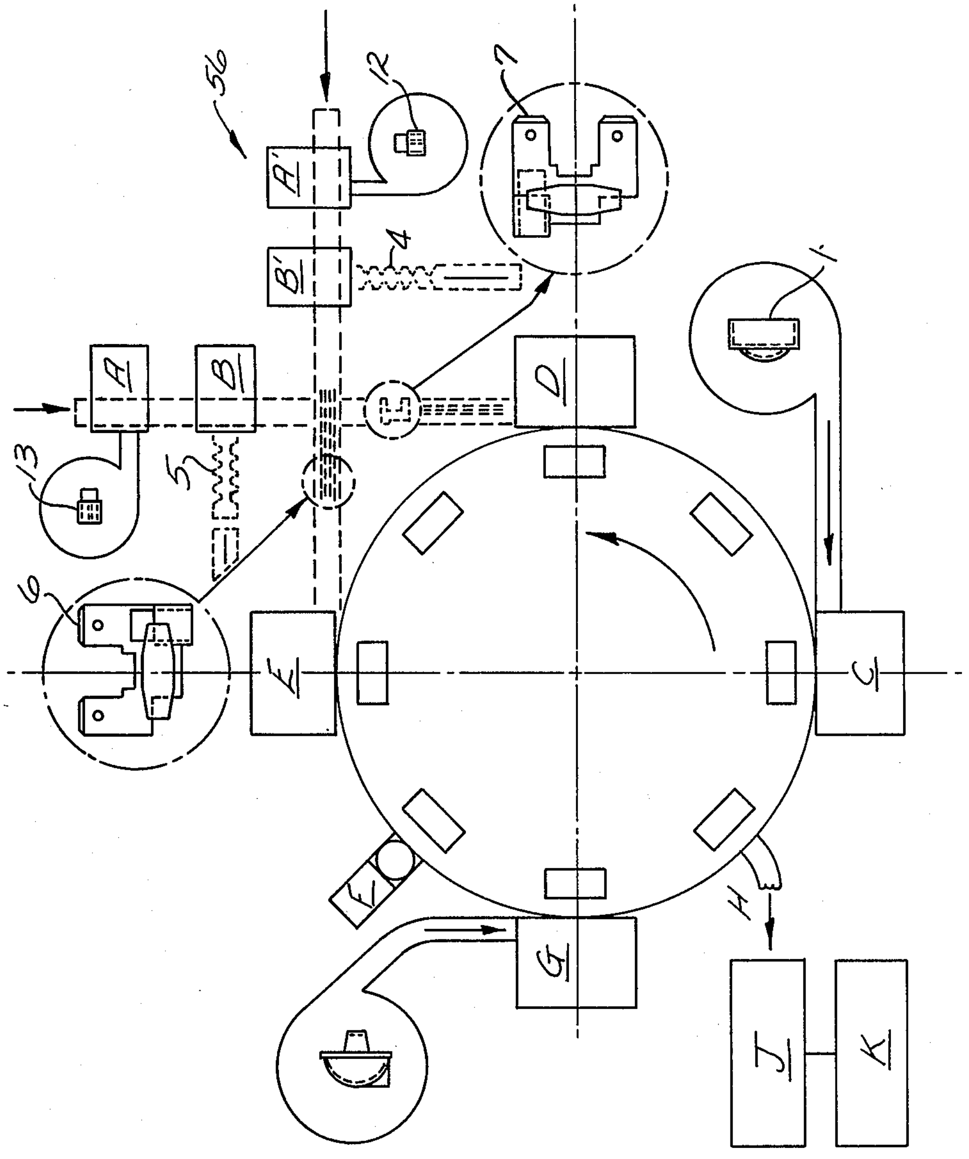

FIGS. **9*a* and 9*b*** show in detail one of the retention and contact springs with the thermosensitive wafer (PTC) of the relay according to the invention;

FIGS. **10*a*, 10*b* and 10*c*** show three circuit arrangements for the relay according to the invention;

FIGS. **11*a*, 11*b* and 11*c* show various mechanical forms for mounting the relay according to the invention, and FIG. 12** shows schematically an assembly line for the relay according to the invention.

DESCRIPTION OF THE PREFERRED EMBODIMENTS

Figure 1:
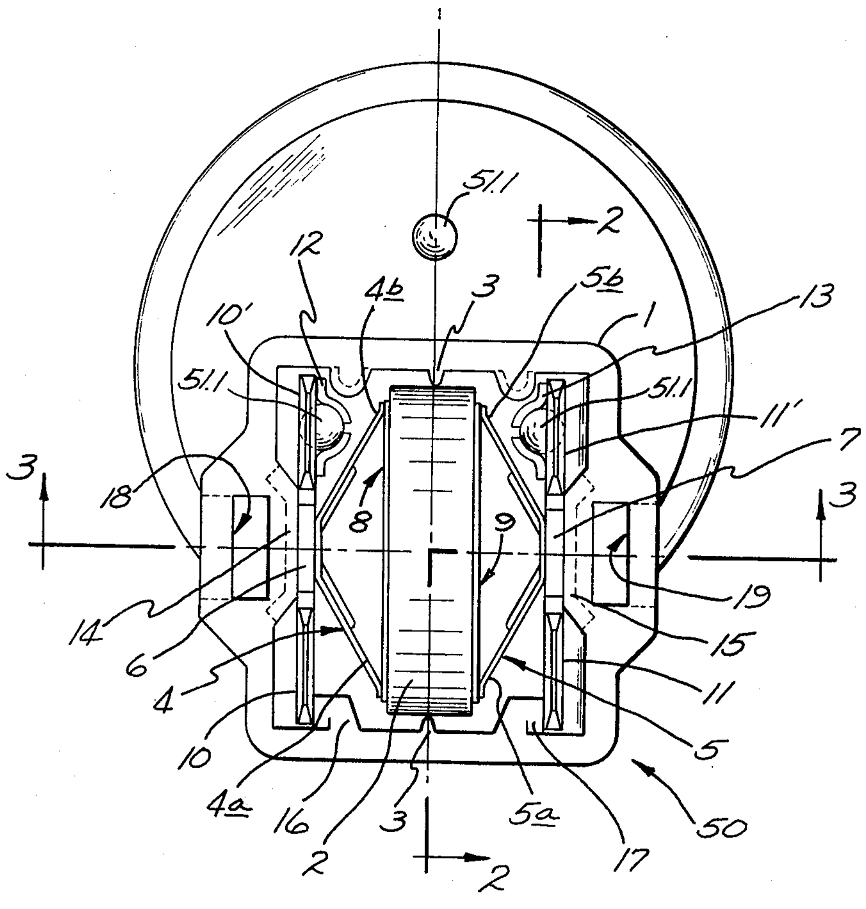
FIG. 1 shows a top view of the thermal relay according to the invention with the lid removed.

Referring to the drawings, particularly to FIG. 1 thereof, the thermal relay 50 according to the invention includes a case 1 of electrically and thermally insulating material inside of which is disposed a wafer 2 of a material with a positive coefficient of temperature (PTC) of a type well known to the skilled in the art. (See for example U.S. Pat. Nos. 3,750,082 and 3,842,188 of Danfoss A/S). Preferably the wafer size is relatively small while being sufficient to achieve the desired start winding performance. Where the PTC material comprises a conventional doped barium titanate ceramic material having a 130° C. Curie temperature, the wafer typically has a diameter of about 0.700 inches and a mass of about 5 grams for 220 volt motors and smaller, for example 3 grams when adapted for starting 120 volt motors.

The wafer 2 is positioned by ribs 3 made on the inside of the case 1 and by two leaf springs 4, 5 fastened to electrical connection means 6, 7 to be hereinafter described in greater detail. The springs 4, 5 have fins or arms **4*a*, 4*b* and 5*a*, 5*b* that make contact with the metallized surfaces 8, 9 respectively as conventionally provided on the wafer 2**.

The electrical connection means 6, 7 are joined with upper "quick-connect" type terminals 10, 10', 11, 11' and with resilient, lower "plug-on" connectors 12, 13 arranged so as to be self-adjusting when inserted on the pins 51.1 on an airtight connector (fusite) of a refrigerator compressor, as denoted at 51 or on a suitable terminal board. Furthermore, the electrical connection means 6, 7 are held in position by projections or ribs 14, 15 and 16, 17 made on the inside of case 1. On the outside of case 1, apertures 18, 19 are provided which engage detents or tongues formed on the lid of the device. The said tongues are not shown in FIG. 1.

Figure 2:
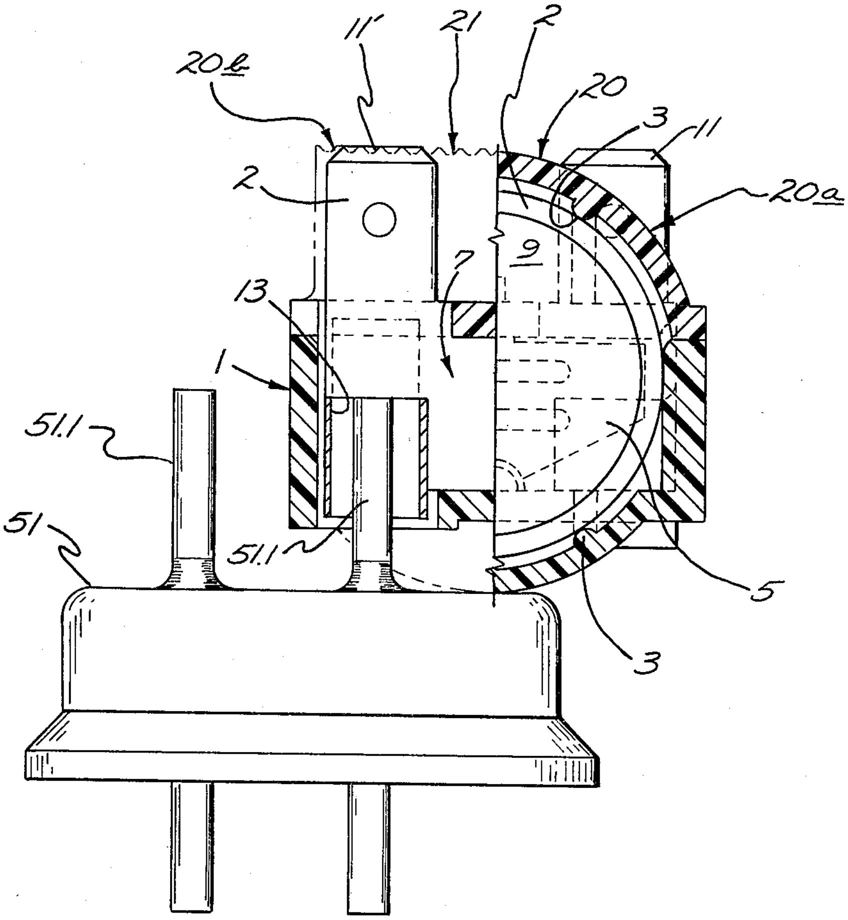
FIG. 2 shows a cross sectional view along section 2—2 of FIG. 1, with the lid mounted.

FIG. 2 shows a cross section along section 2—2 of FIG. 1, showing lid 20 in position on case 1. The broken line 21 shows the course of the otherwise unillustrated part of lid 20. It can be seen there that the curved part **20*a* joins with a knurled flat part 20*b* so as to facilitate the insertion of the device of the invention of the pins 51.1 of the airtight connector 51** or other electrical connection device.

Figure 3:
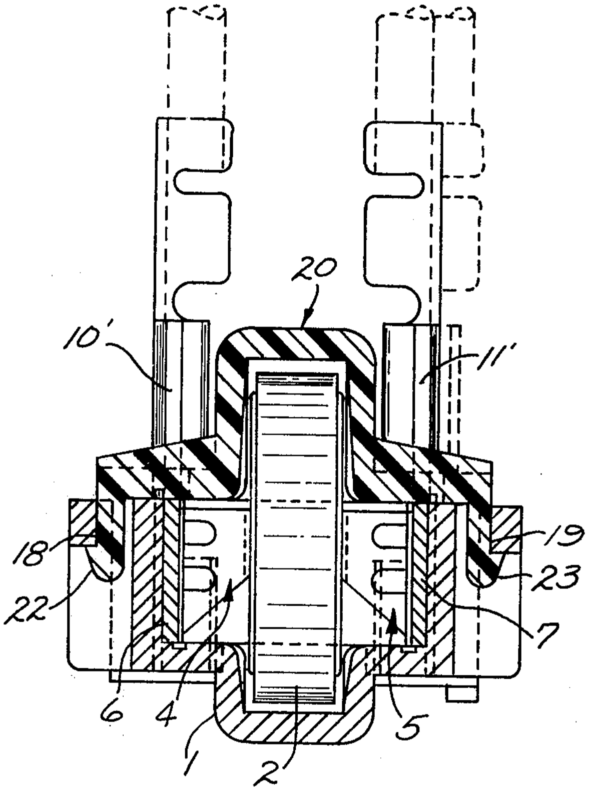
FIG. 3 shows a cross sectional view along plane 3—3 of FIG. 1, with the lid mounted.

FIG. 3 shows a cross section along section 3—3 of FIG. 1 wherein the device in question is shown separate from the airtight connector 51 (fusite) or other connection device. In this Figure, the lid 20 is seen in position on case 1, with the apertures 18, 19 engaged by the snap-action detents or tongues 22, 23 of the lid. The terminals 10, 11 are then adapted to be connected to pin cables 56. The other components have already been illustrated and will therefore not be repeated here.

Figure 4:
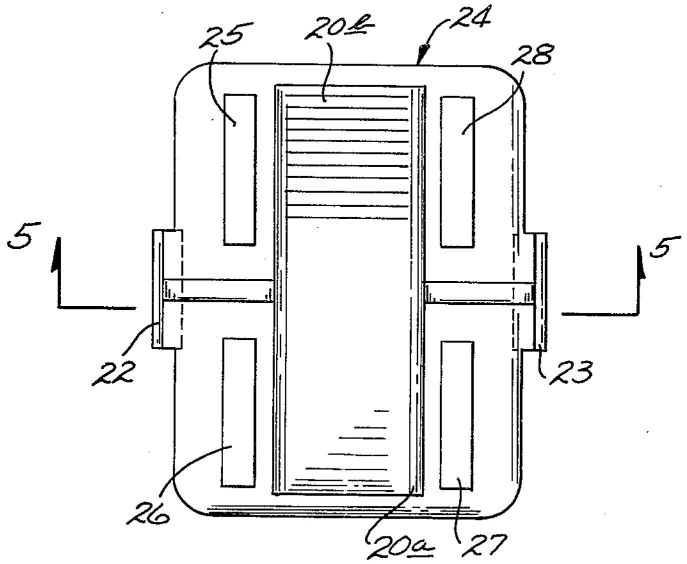
FIG. 4 shows a top view of the lid partially shown in FIGS. 2 and 3.
Figure 5:
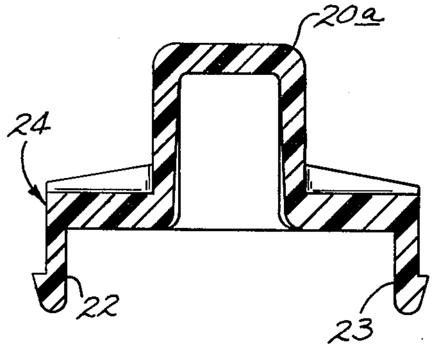
FIG. 5 shows a cross section along section 5—5 of FIG. 4.

FIG. 4 shows a top view of the lid illustrated partially in FIGS. 2 and 3. It shows a quadrangular flange element 24 provided with apertures 25, 26, 27, 28 for the connection terminals 10, 10', 11, 11' and the detents or tongues 22, 23 which engage with apertures 18, 19 of case 1. FIG. 4 shows the curved part 20*a* and the knurled part 20*b*. FIG. 5 shows a cross section along section 5—5 of FIG. 4.

Figure 6:
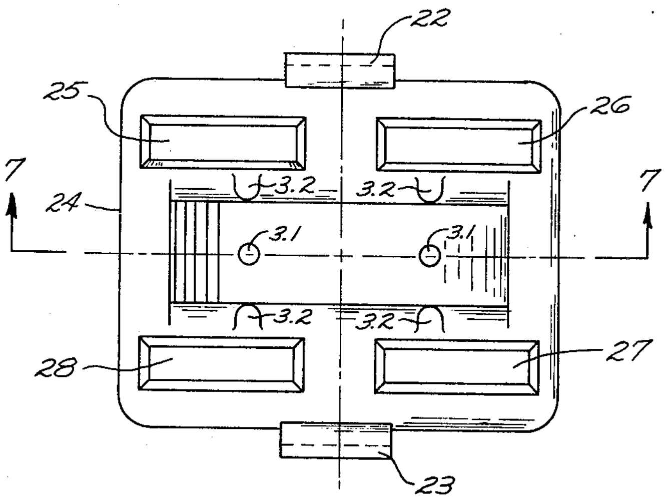
FIG. 6 shows a bottom view of the lid of FIG. 4.
Figure 7:
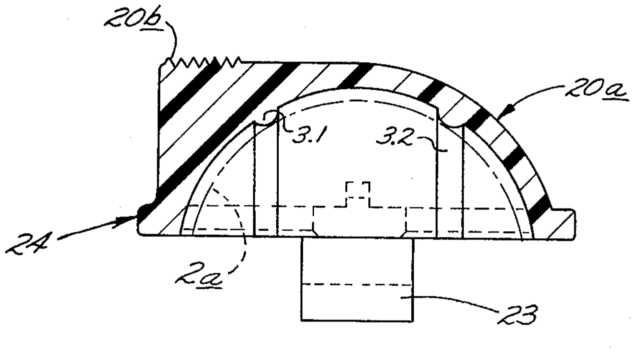
FIG. 7 shows a cross sectional view along section 7—7 of FIG. 6.

FIGS. 6 and 7 show respectively a bottom view of the lid shown partially in FIGS. 2 and 3 and a cross sectional view along section 7—7. The said Figures show the internal ribs 3.1, 3.2 of the lid for the positioning of the PTC wafer as indicated by broken line 2*a* in FIG. 7, arranged so as to enclose the PTC wafer and to minimize the thermal conduction from the wafer to the case and thus minimize power losses once the working or motor-running temperature of the PTC element is reached. The configuration of the case 1 and the lid 20 also cooperate to provide the relay with a generally ball-shaped outer housing configuration as shown in the drawings, thereby to minimize the surface-to-volume ratio of the relay structure to further reduce power loss when the motor-running temperature of the relay is reached.

Figure 8:
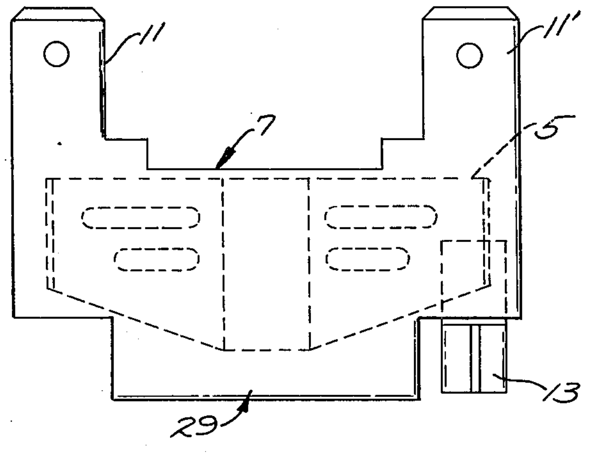
FIG. 8 shows a detail of the electric contacts of the relay according to the invention.

FIG. 8 shows a detail of the electrical contacts 6 or 7 of the relay according to the invention. The contact means 7, for example, has a body 29 on which terminals 11, 11' of the "quick-connect" type are disposed and a socket 13 of the "plug-on" type is welded to the body 29 for joining to the so-called "fusite" pin 51.1 or terminal board. On the central part of body 29, a thin retention and contact spring 5 for the PTC wafer is fastened, preferably spot welded to the body, as previously indicated by references 4, 5 in FIG. 1.

Figure 9A:
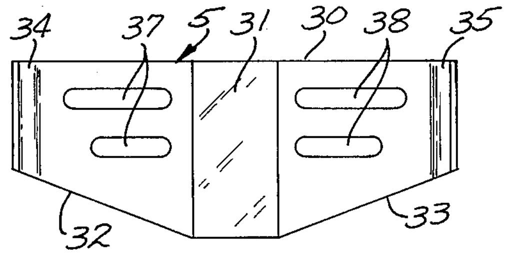
Figure 9B:
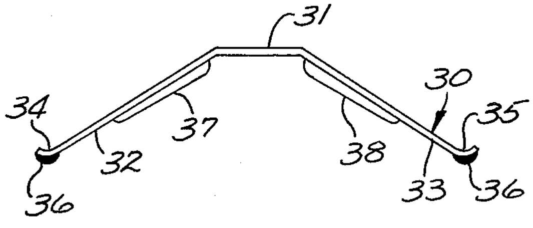

FIGS. 9*a* and 9*b* show in detail one of the retention and contact springs 5 for the thermosensitive wafer (PTC) of the relay according to the invention.

The spring 5 has a body 30 of a material of suitable electrical conductivity and of a relatively high thermal resistance metal such as stainless steel, and has a central part 31 for fastening, preferably by spot welding, to the body 29 of the electrical contact 7 of the relay. The spring body 30 has two fins 32, 33 with turned up and narrowed ends 34, 35 on each of which ends a layer 36 of electrically highly conducting material, such as silver, is applied for a good electrical contact with the conducting surfaces 8 or 9 of the PTC wafer 2. The silver coating is applied suitably by "top-lay", "plating", "tape weld" or similar techniques. That is, the springs 4, 5 have limited heat-transfer engagement with the PTC wafer 2, are formed of a material of high thermal resistance, and have relatively limited cross-sections, thereby to minimize thermal conduction from the PTC wafer 2 to the case 1 for further reducing power loss when the motor-running temperature of the relay is reached. Thus the springs form a thermal barrier between the PTC wafer and the relay housing. Preferably, the springs 4, 5 have a thermal resistance $R_T$ (seconds °C.)/(Calorie) on the order of 1000 or more for significantly retarding heat dissipation from the PTC wafer 2.

There are finally provided from the mechanical point of view ribs 37, 38 for stiffening the fins 32, 33 so as to obtain an appropriate pressure against the PTC wafer. Additionally, slots may be provided (not shown) in the fins 32, 33 to impede conduction of heat through the spring. For instance a slot could be disposed intermediate ribs 37 and another intermediate ribs 38. Although the configuration of the spring 30 is the one actually preferred, helical springs could also be employed in the relay 50 of this invention.

In a preferred embodiment of this invention, the relay utilizes a PTC wafer of selected small size, has a generally ball-shaped outer configuration as noted, and has springs 4 and 5 of high thermal resistance as above described but so that lower dissipation by the relay at the motor running temperature of the relay is on the order of 2.0 watts or less in 120 or 220 volt motor applications while also being adapted to cool down for restarting the motor within a period on the order of 200 second or less after interruption of motor operation. That is, the rate of heat dissipation is retarded so that the PTC wafer 2 operates at very reduced current levels in its high resistance condition to minimize power loss in the relay but the relay structure as described has such small thermal mass that it is still adapted to cool down to reset within a relatively brief period of time after an interruption in motor operation.

It should be noted that the configuration and the coefficient K=Force/Deflection of the spring are chosen so that the system formed by the PTC wafer and the springs has a proper mechanical oscillation frequency far from the typical excitation frequencies met with, for example, in motor compressors for refrigerators fed at 50 to 60 Hz. Preferably, the resonance frequency of the spring-wafer system is made above 300 Hz.

Figure 10A:
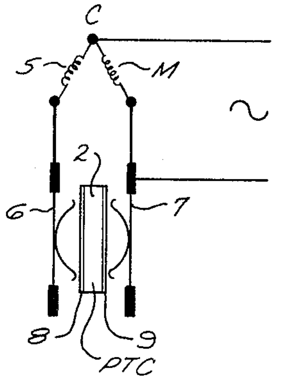
Figure 10B:
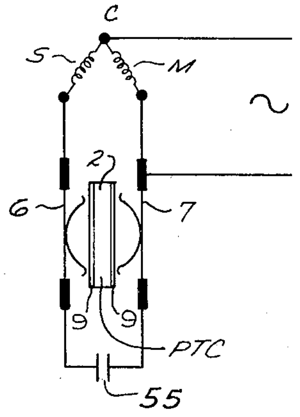
Figure 10C:
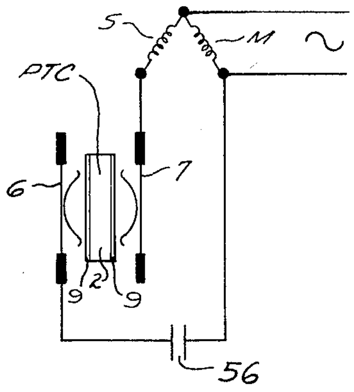

The disposition of two "quick-connects" per each side of the PTC wafer makes possible a flexibility of application as illustrated in FIGS. 10*a*, 10*b*, 10*c*.

FIG. 10*a* shows the starting with only the PTC 2; FIG. 10*b* shows the starting with PTC 2 and with a parallel-connected capacitor 55, and FIG. 10*c* shows starting with the PTC 2 in series with a capacitor 56. These circuital arrangements are well known to one skilled in the art and thus need not be explained in detail here.

When used in the FIG. 10*a* and 10*b* circuit configurations the relay is coupled to the "fusite" as shown for instance in FIGS. 1 and 2 where two pins are electrically connected to the relay by being inserted therein.

When a series connected capacitor is used as shown in FIG. 10*c* one "fusite" pin is electrically connected to the relay and an auxiliary structural member is physically but not electrically connected to another "fusite" pin to provide support for the relay.

Figure 11A:
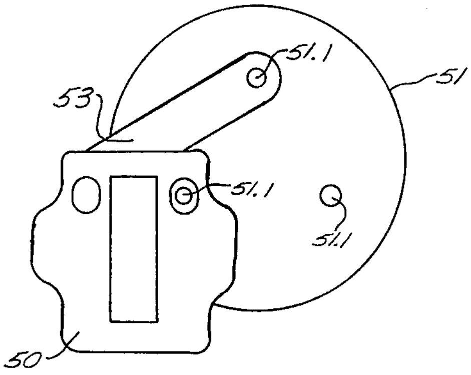
Figure 11B:
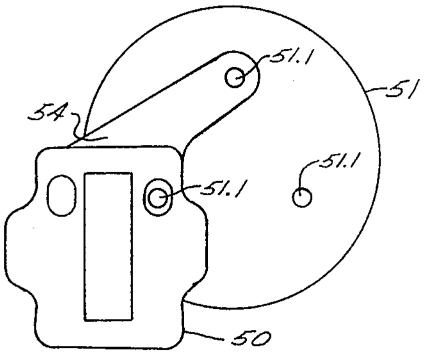
Figure 11C:
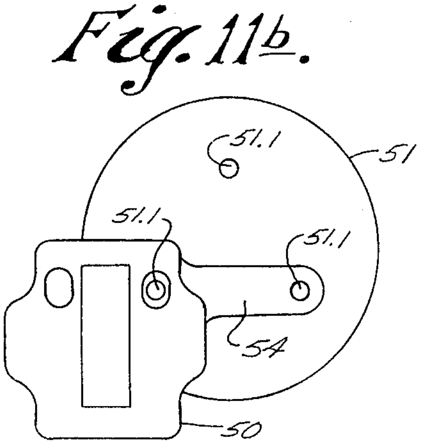

FIGS. 11*a*, 11*b*, 11*c* show three examples according to the invention for fastening the thermal relay 40 on a three-pole airtight connector (fusite) 51 on an electrical motor when the FIG. 10*c* is employed.

FIG. 11*a* shows the thermal relay 50 fastened to the "fusite" 51 by means of one of the plug-on 12, 13 and an auxilliary bracket 53. In FIG. 11*b*, the support or holder 54 is made directly on the case of the thermal relay 50. In FIG. 11*c*, a variation of FIG. 11*b* is shown wherein the support or holder 54 is placed in a different location.

FIG. 12 shows, by way of example, an assembly line 56 with a circular course for the relay according to the invention. The system according to the invention, as described further below, combines the assembly of the parts "on line" in synchronism with the assembly of the parts on a "revolving table". The operations are as follows:

The bodies of the terminals 6, 7 made in strip form are inserted in two assembly lines A, B, and A', B' which provide:

(a) feeding the connector 12, 13, positioning of the same on the terminal 6, 7 and welding (A, A')

(b) feeding of the springs 4, 5 in strip form, positioning of the spring on the terminal, welding and separation of the same from the strip (B, B').

There are thus obtained at the end of the said lines the terminals 6, 7 in strip form with the connectors 12, 13 and the springs 4, 5 mounted, ready to be inserted in the base 1.

The assembly phases are as follows:

The base is fed and guided by means of a vibrator in station C of the rotating table system 56. The station provides for the transfer of the base 1 on a suitable fixture situated on the rotating table.

With a rotary movement of the table, the positioned base moves toward station D.

In the meantime, the above described subsidiary lines A, B and A', B' provide the stations D and E with terminals 6, 7 carrying connectors and springs, still in the form of strips.

The stations D and E first clamp and then separate a terminal with connector and spring mounted from the strip and subsequently inset it forcibly into the base 1.

At the exit of station E, the base positioned on the revolving table has the two complete terminals 6, 7 with connectors and springs mounted.

In station F, a transfer system inserts between the contacts (springs) 4, 5 the PTC wafer which is held in a force fit between the said contacts.

The thus mounted parts of components that make up the relay move, still by means of the rotating table, towards station G where a vibrator feeds and steers the lids 20 in the station where the lid is mounted and fastened onto the base.

The completely assembled relay is ejected at station H and moved automatically toward the process lines J and K which control and register the respective data for the above described device and system.

The drawings show a construction of base or case and lid equipped with means of fastening by mechanical engagement.

However, the lid could also be fastened to the base by means of gluing or by the known ultrasonic bonding technique, or also by thermal action.

Furthermore, although leaf springs are mentioned for the PTC wafer, the same could equally constitute helical or spiral springs.

Furthermore, from the electromechanical point of view, mention was made of a thermal relay joined to an airtight connector (fusite). The thermal relay could, however, just as well be mounted on a separate terminal board. When desired or when required for purposes or complying with safety standards, the upper terminals "quick-connects" can be protected by a sheath by a extension of the lid.

The present invention has been described by way of a preferred form of realization. It is understood, however, that variations and modifications can be made in the same, without departing from the scope of the present invention.

We claim:

1. A thermal relay particularly for starting single phase asynchronous motors comprising a housing, a resistor of a material of positive temperature coefficient of resistivity within the housing, and resilient electrically conducting metal contact means disposed between the housing and respective opposite sides of the resistor for connecting the resistor in an electrical circuit, the contact means having portions of a metal material of relatively high thermal resistance retarding heat transfer from the resistor to the housing through the contact means, said contact means including relatively thin spring portions formed of said metal material having said high thermal resistance to provide a thermal barrier between the resistor and housing, the thin spring portions being formed of stainless steel to be disposed in firm electrical engagement with the opposite sides of the resistor while forming said thermal barrier.

2. A thermal relay as set forth in claim 1 wherein the housing is formed of a thermally insulating material and substantially encloses the resistor, the housing having a generally ball-shaped outer configuration restricting the surface to volume ratio of the relay to retard heat dissipation from the relay.

3. A thermal relay as set forth in claim 1 wherein the contact means have upper and lower terminal means thereon extending from opposite sides of the housing.

4. A thermal relay as set forth in claim 3 wherein the lower terminal means comprise resilient socket means for facilitating mounting of the relay on the fusite pins of a refrigerator compressor motor.

5. A thermal relay as set forth in claim 3 wherein the housing comprises an open-ended case receiving the resistor therein, the contact means are fitted between the case and respective opposite sides of the case for positioning the resistor in the case, and the housing further comprises a cap-shaped lid disposed over the open case end for substantially enclosing the resistor, the lid having means releasably engaging the case holding the relay in assembled relation.

6. A motor starting relay for a single phase motor having start and run windings comprising a resistor embodying a material of positive temperature coefficient of resistivity which displays a sharp increase in resistivity when heated above a selected temperature level, a housing of thermally insulating material for the resistor, and a pair of resilient electrically conductive metal contact means electrically engaging respective opposite sides of the resistor for connecting the resistor in series with the start winding of a motor, characterized in that, the contact means are disposed between the housing and the respective opposite sides of the resistor holding most of the resistor surfaces spaced from the housing to retard heat transfer from the resistor directly to the housing, the contact means have at least some electrically conductive metal portions thereof of a material of relatively high thermal resistance to retard heat transfer from the resistor to the housing and from the resistor exteriorly of the housing through said contact means, and the housing is compact and generally ball-shaped and is proportioned to substantially enclose and closely surround the resistor and substantial portions of the contact means for restricting the thermal mass of the relay as well as the surface to volume ratio of the housing to cooperate with said thermal conductivity characteristics of the contact means so that the relay is adapted to limit current in the start winding of the motor after starting of the motor has been completed and heat dissipation from the relay is minimized during running of the motor for enhancing operating efficiency of the motor while the cool down period of the relay is also minimized to permit prompt motor restarting if operation of the motor is interrupted.

7. A motor starting relay as set forth in claim 6 wherein the contact means include terminal portions to be connected in an electrical circuit for connecting the resistor in series with the start winding of said motor and relatively thin spring portions secured to said terminal portions to resiliently engage said opposite sides of the resistor, and said thin spring portions are formed of said metal of said high thermal resistance to provide a thermal barrier between the resistor and the terminal portions and housing.

8. A motor starting relay as set forth in claim 6 wherein the contact means have a thermal resistance of at least about 1000 sec. °C./calorie, and the relay is adapted to dissipate less than about 2 watts during normal running operation of the motor.

9. A motor starting relay as set forth in claim 8 wherein the relay is proportioned with a sufficiently small thermal mass for normally permitting cooling and resetting of the relay within about 200 seconds or less after interruption of motor operation.

10. A motor starting relay for a single phase motor having start and run windings comprising a resistor embodying a material of positive temperature coefficient of resistivity, a housing of thermally insulating material substantially enclosing the resistor, and a pair of resilient electrically conductive metal contact means electrically engaging respective opposite sides of the resistor for connecting the resistor in series with the start winding of a motor, the contact means being disposed between the housing and the opposite sides of the resistor holding most of the resistor surfaces spaced from the housing to retard heat transfer from the resistor to the housing, the contact means having portions thereof of a metal material of relatively high thermal resistance to retard heat-transfer from the resitor to the housing, the contact means including terminal portions and relatively thin spring portions secured to said terminal portions, said thin spring portions of the contact means being formed of stainless steel.

11. A motor starting relay as set forth in claim 10 wherein said spring portions have silver coatings on ends thereof electrically engaging the resistor.

* * * * *